United States Patent [19]

Sugano

[11] 3,913,519

[45] Oct. 21, 1975

[54] ADVANCE WARNING DEVICE

[75] Inventor: Saburo Sugano, Yokohama, Japan

[73] Assignee: Sony Corporation, Tokyo, Japan

[22] Filed: Oct. 18, 1973

[21] Appl. No.: 407,575

[30] Foreign Application Priority Data

Oct. 19, 1972 Japan.............................. 47-120867

[52] U.S. Cl. ........ 116/114 J; 116/67 A; 200/61.17; 242/57; 242/191

[51] Int. Cl.$^2$. G08B 5/36; G01D 5/32; G11B 15/18; B65H 25/30

[58] Field of Search....................... 242/57, 191, 186; 200/61.17, 61.18; 116/67 A, 114 J

[56] References Cited

UNITED STATES PATENTS

| | | | |
|---|---|---|---|
| 2,514,402 | 7/1950 | Lyon | 242/191 |
| 3,480,230 | 11/1969 | Hosono et al. | 242/191 |
| 3,759,463 | 9/1973 | Yoshii | 242/191 |
| 3,787,690 | 1/1974 | Neff | 242/190 |

*Primary Examiner*—George F. Mautz
*Attorney, Agent, or Firm*—Hill, Gross, Simpson, Van Santen, Steadman, Chiara & Simpson

[57] ABSTRACT

Apparatus for indicating a predetermind position on a filament such as a magnetic tape transported between supply and take-up reels. Such a predetermined position is representative of the amount of usable recording medium remaining on the supply reel from which the tape is spooled.

The apparatus is characterized by the provision of a normally operating signal source and means for blocking the signal.

The blocking means is removed upon achievment of a predetermined change in velocity of one of the reels occasioned when almost all of the tape has been removed from the supply reel to provide a warning alerting an operator that the predetermined quantity of tape remains on the supply reel.

7 Claims, 8 Drawing Figures

ADVANCE WARNING DEVICE

BACKGROUND OF THE INVENTION

This invention relates, in general, to position sensing in conjunction with a transported filament such as a record medium and, more particularly to position sensing structure adapted for detecting a predetermined point along the record medium.

In the process of magnetic tape recording, it is desirable to automatically detect a predetermined position along the tape which is indicative of a small supply of usable tape remaining on the supply reel for recording.

Detection of the above position is useful as a warning to thereby prevent loss of data transmitted when the quantity yet to be transmitted exceeds the amount of usable tape remaining on the supply reel. Prior art systems for accomplishing the foregoing include mechnical counters, electronic counters, footage meters and other external devices. Other systems, considered to be improvements over the foregoing, rely on special marking on the tape, for example, reflective or clear areas at the predetermined position on the tape which cause light impingement on a photodetector, as the spot or clear area passes a light source. While the provision of reflective spots or clear areas in a magnetic tape, and photodetector means for sensing them, provide satisfactory results, they impose certain limitations. For example, it may be necessary to open the cassette in order to modify the tape according to the requirement of a particular system in which it is to be used. Moreover, since these modifications are somewhat permanent, a particular predetermined position cannot, if at all, be easily changed. Tape breakage may also modify the effective position.

BRIEF DESCRIPTION OF THE INVENTION

Before the end of the wound tape, an alarm signal such as buzzer or light signal for example is derived. One embodiment of the present invention provides as intermittent light signal to an operator for two minutes before the end of wound tape.

In normal recording operation, a magnet which is mounted on a magnet supporting wheel is rotated by a motor through a pulley or idler assembly. This motor by switch a capstan and a take-up reel spindle are respecticaly driven is rotated at a predetermined constant angular velocity providing a convenient reference velocity. A shield for shielding the magnetic flux form the above magnet is provided adjacent to the magnet. The shield may be provided on a supporting wheel rotated by the tape supply spindle through a rubber belt at an angular velocity that varies as the rotational speed of the tape supply shaft in accordance with the decreasing ratio of the wound coil of tape on the supply reel.

Since the tape speed is constant, the reducing diameter of supply causes a rapid increase in reel velocity near the end of the tape. Upon attaining a reel speed indicative of a predetermined small amount of remaining tape, the shield is moved away from the magnet allowing the magnetic flux to intermittently energize a magnetic switch to energize a visible or audible signal.

DESCRIPTION OF THE DRAWINGS

FIG. 6(*a*) is a schematic view of the arrangement shown in FIG. 6 in a different state of operation.

DETAILED DESCRIPTION OF THE INVENTION

Figure 1:
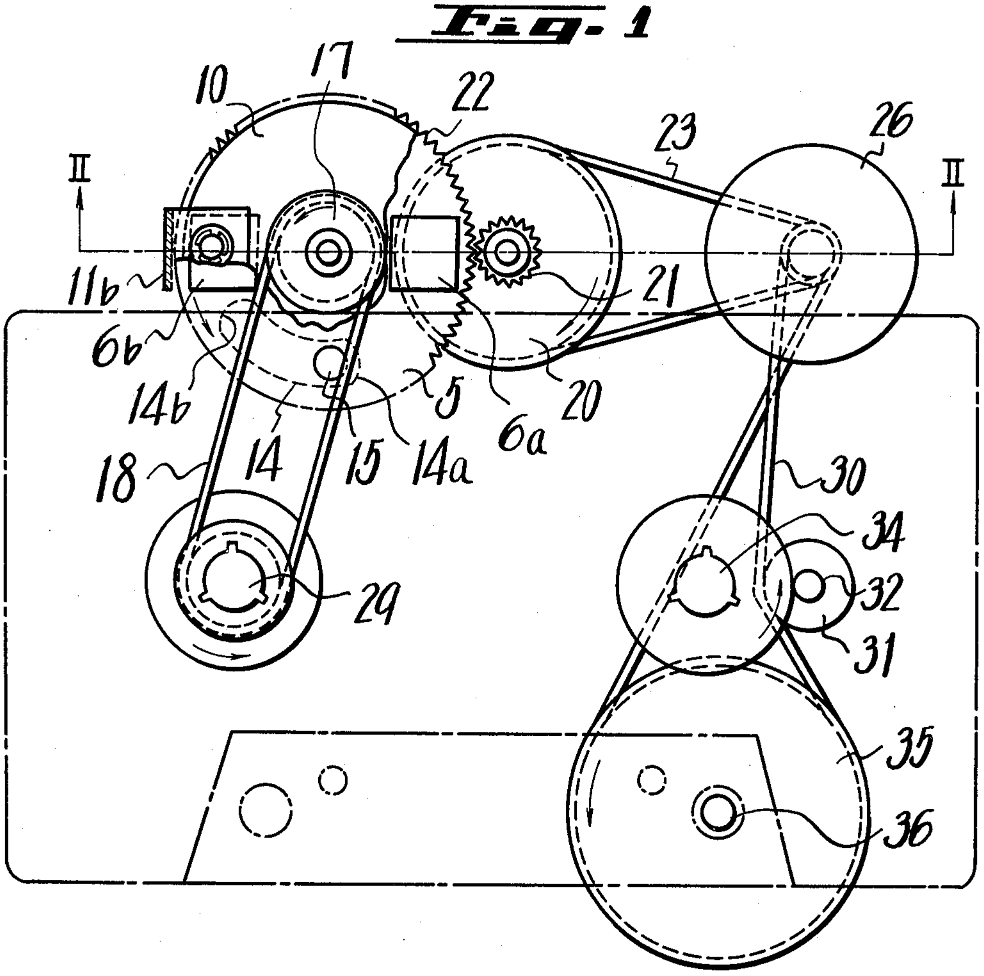
FIG. 1 shows a fragmentary view in plan of an embodiment of the present position sensing device.
Figure 2:
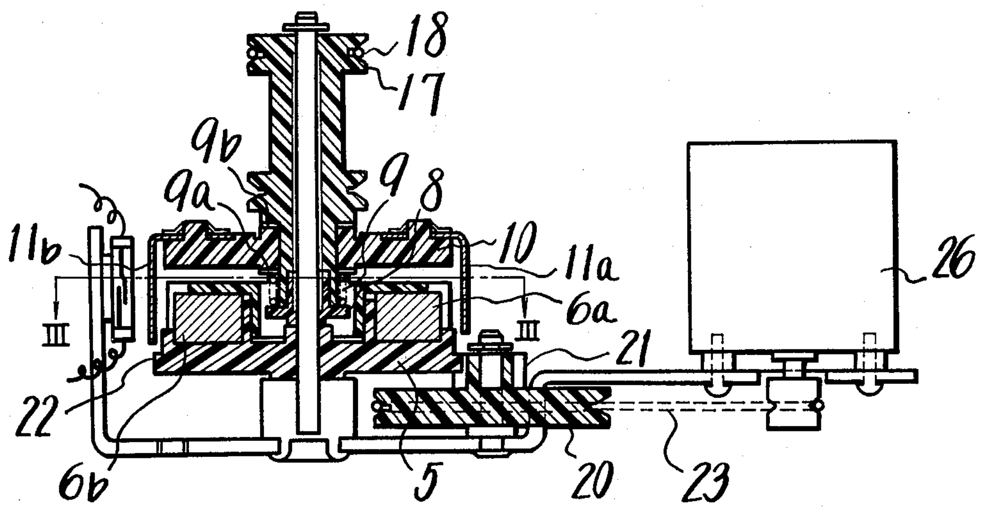
FIG. 2 shows a vertical cross-sectional view of the position sensing device taken along line II—II of FIG. 1.
Figure 3:
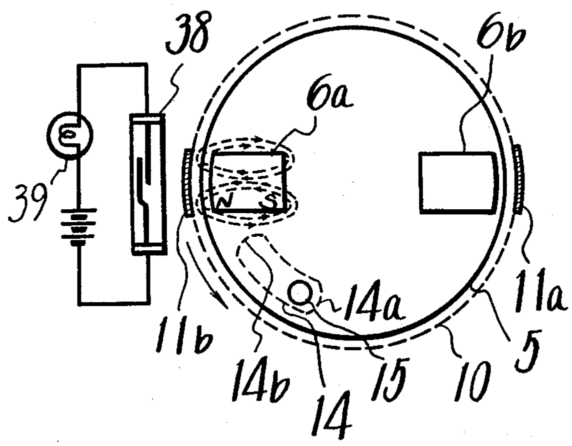
FIG. 3 shows a vertical view taken on line III—III in FIG. 2 for explaining the operation of the sensing device.
Figure 3A:
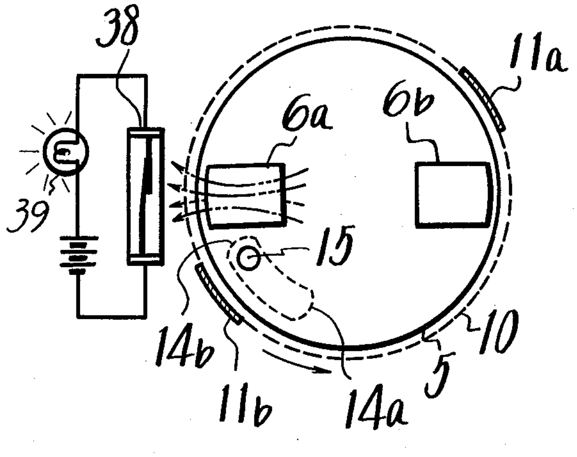
FIG. 3*a* shows the structure of FIG. 3 in a different state of operation.

A first embodiment of tape position sensing device, employed in a tape recorder, is shown in FIGS. 1–3.

A pair of magnets 6*a*, 6*b* is mounted on supporting wheel member 5 which is rotated by main drive motor 26 through belt 23, pulley 20, pinion gear 21 and gear teeth 22. The motor 26 typically also drives the tape-driving capstan 36 at a substantially constant rotational speed via belt 30, idler pulley 31 and flywheel 35. Friction shaft 32 of the idler 31 slip drives take-up spindle 34 faster than capstan 36 to take up the tape leaving capstan 36.

Shielding plates 11*a*, 11*b* of magnetic material for shielding the magnetic flux from the above magnets 6a, 6b are provided on a supporting wheel member 10 which is rotated by a tape supply reel spindle 29 through belt 18 to pulley 17.

Since the speed of the tape is constant, as determined by the speed of capstan 36, the rotational speed of the supply reel rapidly increases near the end of wound tape as the diameter of the wound tape on the supply reel decreases with removal of tape therefrom.

In this embodiment, the rotational speed of the shield wheel 10 is lower than that of the magnet supporting wheel 5 while a substantial amount of tape remains on the supply reel. However, the rotational speed of the shield wheel 10 becomes higher than that of the magnet supporting wheel 5 near the end of the tape supply on the supply reel. At such time, the position of the pair of the shield plates 11*a*, 11*b* is shifted relative to the location of the pair of the magnets 6a, 6b which is disposed adjacent to the pair of shield plates during normal conditions. When the shift occurs, an alarm signal, for example light emission from a light 39, is derived for alerting an operator.

Figure 4:
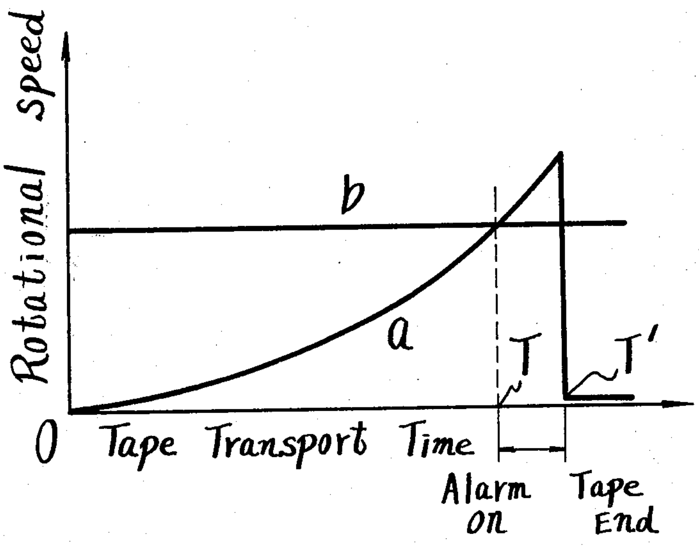
FIG. 4 comprises a graphic explanation of the operation.

FIG. 4, shows a graphic relationship of the retational speeds between the shild supporting wheel 10 (line a) and magnet supporting wheel 5 (line b) individually versus the total time for transportation of the tape from supply reel to take-up reel. When the velocity of the wheel 10 is higher than that of the magnet supporting wheel 5, i.e., time period T–T′, the alarm signal is transmitted. In this first embodiment, since the supply reel is completely stopped when the tape on the supply tape reel reaches its end, the shutter supporting wheel 10 is also stopped and accordingly the alarm signal terminates.

Therefore, the operator is able to sense the termination of the tape supply following the advance warning of its approach.

The shield mechanism is arranged with a slip-drive which permits the member 5 and 10 to rotate at different speeds for a limited motion. A pin 15 is provided on member 5 and projects into arcuate groove 14 on member 10. When member 5 rotates faster than member 10, pin 15 moves to the end 14*a* of slot 14 and thereafter carries member 10 along. Slip is provided between member 10 and pulley 17 by pressure plates 9*a*, 9b under pressure of spring 9 acting against plate 8 press fitted to pulley 17. When the speed of pulley 17 exceeds the speed of member 5, then groove 14 is moved counterclockwise as shown in FIG. 1, carrying shields 11*a*, 11*b* therewith until groove end 14*b* strikes pin 15, whereupon slip again occurs at plates 9*a*, 9*b*. At this point, the magnets 6*a*, 6*b* are unblocked and actuate magnetic switch 38 to energize light 39 twice with each revolutions of the member 5. At the end of the tape, the spindle 29 will stop and continued drive of spindle 34, and member 5 carries pin 15 against groove end 14*a* and shields 11*a*, 11b reblock magnets 6*a*, 6*b*, and deenergize light 39.

Figure 5:
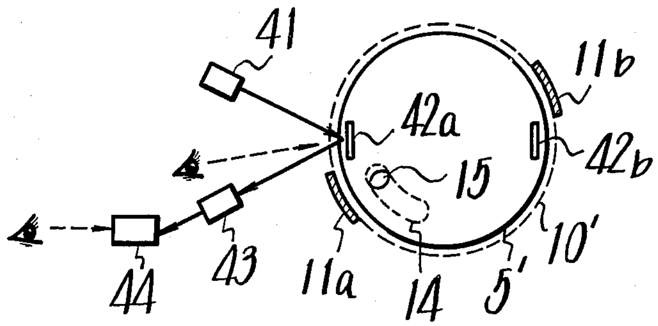
FIG. 5 is a schematic illustration of a second embodiment of the invention.

A further embodiment of this invention is shown schematically in FIG. 5. There, combined with a light beam source 41, are reflectors 42*b*, a detector 43 and signal light 44. The shields 11*a*, 11*b* carried by member 10' are made of a material opaque to the light beam which may be visible light in the preferred form.

When the shields 11a, 11b are shifted from the blocking posisition in the manner described above relative to FIGS. 1–3, the light beam from photo source 41 is sensed by the photo detector 43 by way of the reflectors 42*a*, 42*b* carried by wheel 5'.

Of course, the light beam may be read directly by the operator if desired, or remotely read via a plastic light-tube, mirrors, or the like.

Figure 6:
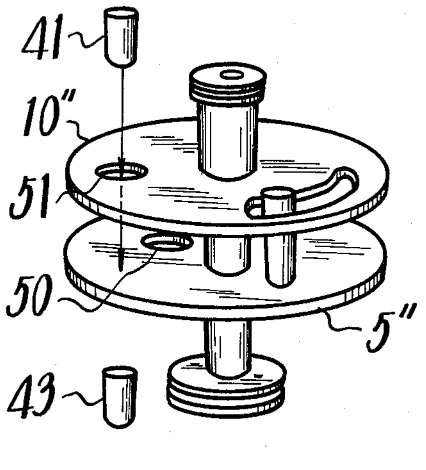
FIG. 6 is a schematic view of a third arrangement shown in a first position.
Figure 6A:
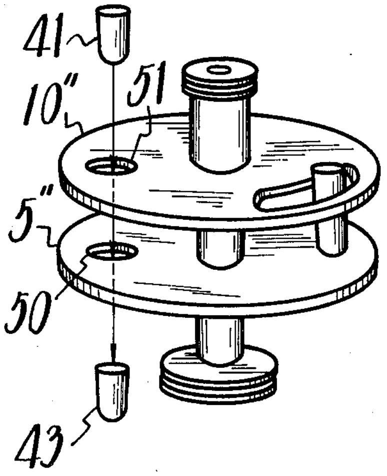

A further embodiment is schematically shown in FIGS. 6, 6(*a*). There, the wheel 5'' is provided with one or more openings 50 and the blocking wheel 10'' likewise carries openings 51. When the wheels are in the first, blocking, relative position shown in FIG. 6, the openings 50, 51 are not aligned and no signal passes. When the wheels shift to the second position shown in FIG. 6(*a*) as the embodiment of FIGS. 1 – 3, the openings are aligned and the signal passes from source 41 to detector 43.

It will be apparent that variations may be made within the skill of the art without departing from my invention. For example, the speed of the shield wheel member may reflect that of the take up reel rather than the supply reel. As the take up reel fills up with tape it rotates slower since, again, the tape speed is determined by the capstan 36 and the take-up reel always runs faster through a slip connection to tension and take up the tape in the take-up reel. In such a case, of course, the speed of the shield wheel 5 would decrease as the supply of tape approaches its end, and the groove 14 would be reversed relative to pin 15 to provide shielding when the speed of the wheel 5 is faster than wheel 10 and non shielding when the wheel 5 slows down to the speed of wheel 10 when the small amount of tape remains in reel 29.

Use of the warning device may also be made in reel to reel film winding or rewinding. In such cases the reference speed may be directly related to the speed of the take up reel, which, although variable in speed, is relatively constant compared to the supply reel as the end of the film approaches.

In view of such variations and others equally obvious, I intend that the scope of the invention be limited solely by that of the following claims:

What is claimed is:

1. In a filament transport system including means for winding the filament onto a take up reel from an undriven supply reel, an advance warning device comprising:

a. a signal source, b. a first rotatable member including means providing transmission of said signal from at least one point thereon, c. a second rotatable member mounted for limited rotary motion relative to said first rotatable member between first and second relative positions, d. shielding means on said second member for blocking the transmission of said signal when said members are in the first relative position, e. means rotating one of said members at a relatively constant reference speed, f. means rotating the other of said members at a speed reflecting the variable speed of one of said reels, and g. means providing a slip connection between one of said rotating means and its respective member whereby said members rotate relative to each other said limited amount to the second relative position to unblock the transmission of said signal when said supply reel retains only a predetermined small amount of filament thereon.

2. The system of claim 1 wherein the said one of said reels comprises the supply reel and the speed of the other of said members is less than said reference speed when said supply reel has a large amount of filament thereon and greater than said reference speed when the filament on the supply reel reduces to said predetermined small amount.

3. The system of claim 1 wherein the said one of said reels comprises the take-up reel and the speed of the other of said members is greater than said reference speed when the take-up reel has a small amount of filament thereon and less than said reference speed when the filament on the take-up reel increases to an amount equal to the total length of filament minus said predetermined small amount.

4. The structure of claim 1 wherein said signal source comprises a magnet on said first member and said shielding means comprises a magnetic material shunting said field only when positioned over said magnet.

5. The structure of claim 1 wherein said signal source comprises means generating a light beam and said shielding means comprises an element opaque to said beam.

6. The structure of claim 5 wherein said light beam is visible light.

7. The structure of claim 5 including light detecting means aligned to detect the passage of light from said source when unblocked by said shielding means.

* * * * *